Patented Nov. 13, 1951

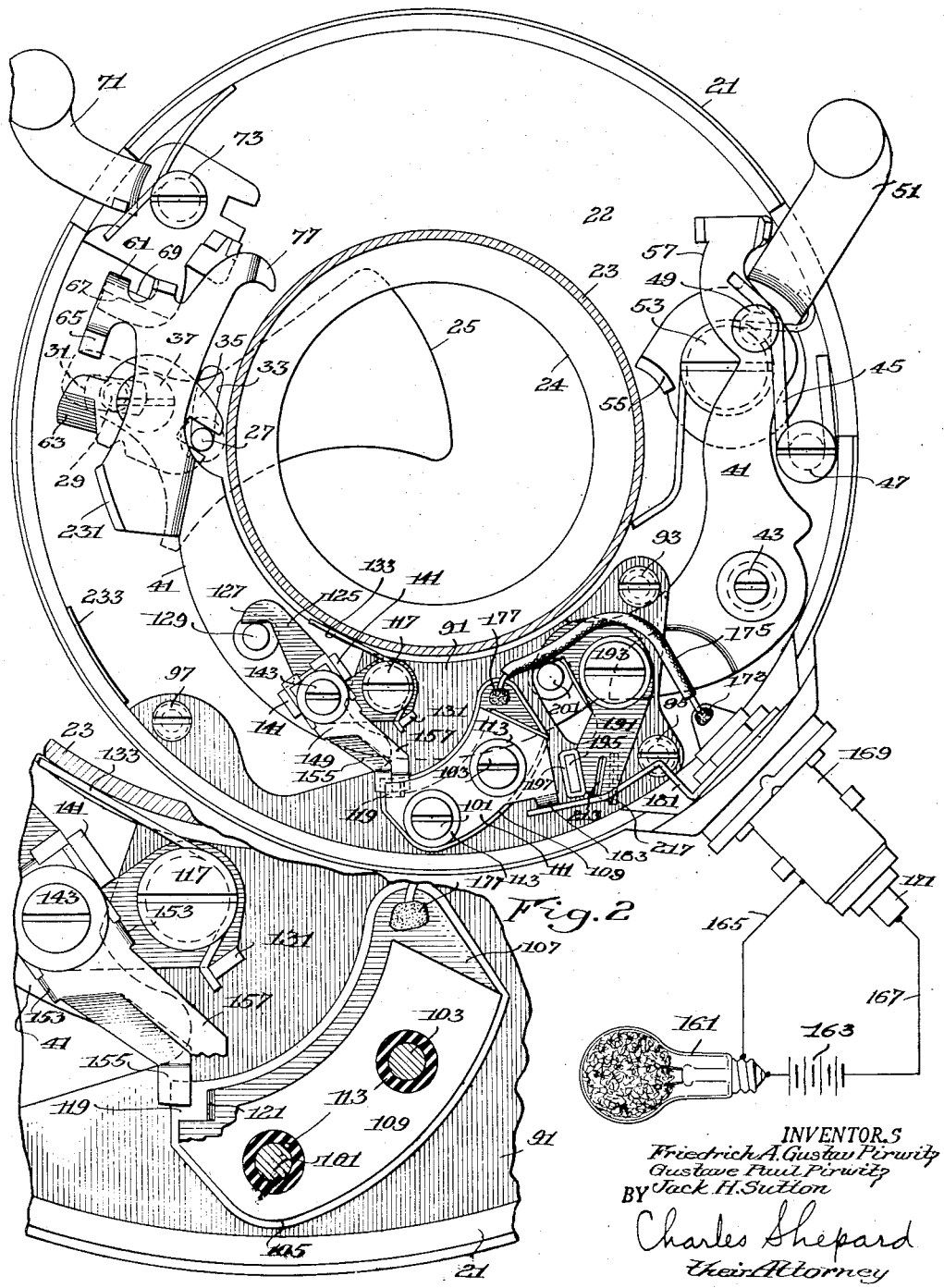

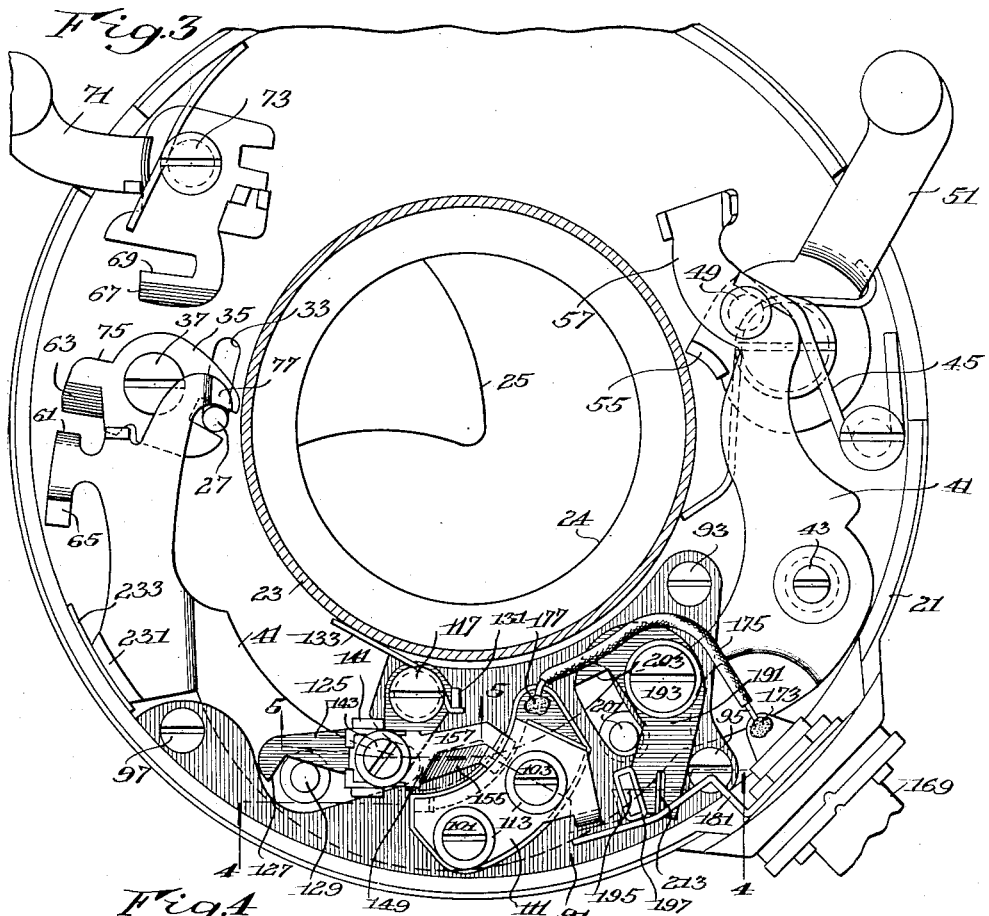
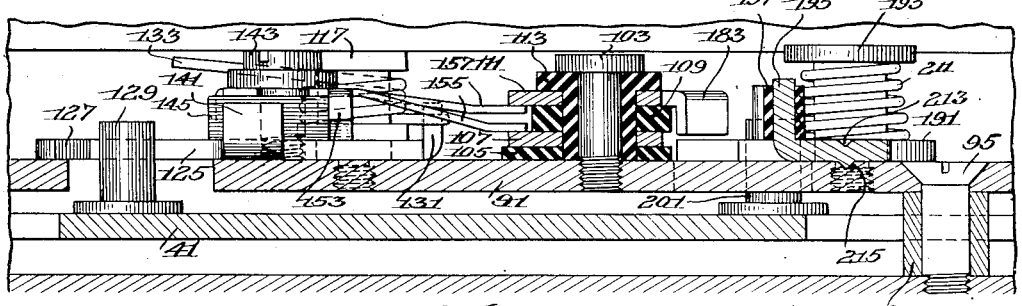
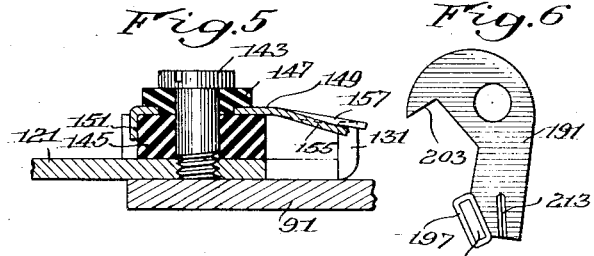

2,575,121

UNITED STATES PATENT OFFICE 2,575,121

PHOTOGRAPHIC SHUTTER WITH BUILT-IN FLASH SYNCHRONIZER

Friedrich A. Gustav Pirwitz, Rochester, Gustave Paul Pirwitz, Irondequoit, and Jack H. Sutton, Rochester, N. Y., assignors to Wollensak Optical Company, Rochester, N. Y., a corporation of New York Application November 21, 1947, Serial No. 787,394

7 Claims. (Cl. 95—11.5)

The present invention relates to a photographic shutter with photoflash synchronizer. An object of the invention is the provision of a simplified, sturdy, and inexpensive form of photoflash synchronizer so designed that it may be initially built into a photographic shutter with a minimum change in the shutter parts as compared with a similar photographic shutter having no synchronizer.

Another object of the invention is the provision of a photoflash synchronizer so designed and constructed that the parts may be more easily and inexpensively manufactured and more easily and quickly assembled, as compared with prior synchronizers.

Still another object is the provision of improved and simplified means for keeping the photoflash electric circuit always open at all times except when an exposure is being made, so that when a fresh photoflash bulb is screwed into the socket, there is no danger of premature flashing thereof.

A further object is the provision of synchronizing means so designed as to be especially adapted to the requirements of relatively low priced shutters.

These and other desirable objects are accomplished by the construction disclosed as an illustrative embodiment of the invention in the following description and in the accompanying drawings forming a part hereof, in which:

Fig. 1 is a diagrammatic front view of a camera shutter according to the present invention and the associated photoflash circuit, with the cover plate and other parts of the shutter removed, and with the mechanism shown in set or tensioned position, ready to make an exposure;

Fig. 2 is an enlarged view of a portion of Fig. 1, with parts broken away;

Fig. 3 is a view similar to Fig. 1 showing the mechanism in run-down position at the completion of an exposure;

Fig. 4 is a section taken substantially on the line 4—4 of Fig. 3;

Fig. 5 is a section taken substantially on the line 5—5 of Fig 3; and

Fig. 6 is a plan of a switch lever forming part of the construction.

The same reference numerals throughout the several views indicate the same parts.

The photoflash synchronizer of the present invention may be applied to photographic shutters of various kinds or styles. Merely as a convenient illustrative embodiment of the invention, it is here shown as applied to an objective or between-the-lens shutter of the set type (that is, one which requires to be set or tensioned by a separate operation before the trigger is actuated to release the shutter to make an exposure), but it will be obvious to those skilled in the art that the invention may also be used with a shutter of the automatic type (that is, one in which the shutter is first tensioned and then released by a single motion of a trigger member in one direction). For convenience, the particular shutter chosen for illustration of the present invention is a shutter of known construction, and may be of substantially the same construction disclosed in United States Patent 2,331,568, granted October 12, 1943, for an invention of Pirwitz.

Referring now to the drawings, the shutter comprises the usual annular casing having the usual outer wall 21 of approximately circular shape, in which casing is a partition plate 22 subdividing the space into a shallow rear compartment containing the iris diaphragm blades and the shutter blades, and a deeper front compartment containing the operating mechanism. This partition plate conveniently carries an inner tubular wall 23 in which one or more photographic lenses are mounted, the wall 23 being associated with an annular beveled ring 24 which lies just in front of the shutter blades and defines the maximum exposure aperture. This aperture is normally closed, as usual, by a plurality of shutter blades which slightly overlap with each other, and which are opened at the proper time to make an exposure in known manner. For convenience of illustration, only one of the shutter blades is here shown, at 25, but those skilled in the art will readily understand that a series of such blades is employed. Each blade is pivoted as at 27 to the usual annular blade ring or revolving ring (not shown), and has a second pivot 29 extending into an approximately radial slot 31 in a fixed part, so that when the blade ring or revolving ring carrying the pivot 27 is turned in a clockwise direction around the tube 23, the shutter blades will be opened, and when the blade ring moves in a counterclockwise direction, the blades will be closed.

The shutter blades and the blade ring or revolving ring lie in a rear compartment of the shutter, beneath the plate 22. As usual, one of the blade pivots 27 extends upwardly through an arcuate slot 33 in the plate 22, where it is engaged by the notched or forked end of a leaf lever or blade lever 35 pivoted on a stud 37 mounted on the plate 22. When an exposure is to be made, this leaf lever 35 is turned first in one direction and then in the other by a master member or master lever 41 pivoted at 43 on a fixed pivot, and constantly urged in a counterclockwise direction on its pivot 43 by a strong motor spring 45 mounted on the stud 47 and having an end engaging the stud 49 on the master lever. A setting lever 51 pivoted at 53 and extending to an accessible position outside of the casing, has an ear 55 adapted to contact with the curved surface 57 of the master member 49 when the setting member 51 is moved downwardly in a clockwise direction from the position shown in Figs. 1 and 3, thereby moving the master member 41 from the relaxed or run-down position shown in Fig. 3 to the tensioned or set position shown in Fig. 1.

As the master member 41 moves from the relaxed position of Fig. 3 to the tensioned position of Fig. 1, a downturned hook 61 on the master member passes over the leaf lever 35 and a lug 65 on the master member rides up an inclined or beveled surface 63 on the leaf lever and then rides across the top of the leaf lever to maintain the end of the master member in somewhat elevated position until the hook 61 on the master member reaches and rides up an inclined or beveled portion 67 (thus elevating the end of the master member slightly higher) and then drops down behind a shoulder 69 on the release lever or trigger 71 pivoted at 73 and extending out to an accessible position externally of the shutter casing. Just as the hook 61 on the master member reaches the shoulder 69, the end of the lug 65 on the master member rides off of the leaf lever 35, so that the lug 65 drops behind the shoulder 75 on the leaf lever, substantially at the same time that the hook 61 drops behind the shoulder 69 on the release lever. This completes the setting of the parts, and they remain in this position until the trigger or release member 71 is turned in a counterclockwise direction about its pivot 73, which withdraws the shoulder 69 from the hook 61 on the master member, allowing the motor spring 45 to turn the master member in a counterclockwise direction about its pivot 43. During such counterclockwise motion of the master member, the lug 65 strikes against the shoulder 75 of the leaf lever 35, turning this lever in a counterclockwise direction about its pivot 37, thereby moving the pin 27 of the blade ring and moving the blade ring itself in a clockwise direction to open the shutter blades. When the blades are fully opened, the lug 65 slips off the left end of the leaf lever 35 and the hook 77 on the master member 41 engages the pin 27 and moves it in a reverse direction, thereby closing the shutter blades.

The parts thus far described are all well known in the art, and correspond in general to the similar parts disclosed in said United States Patent 2,331,568. Retarding mechanism for making exposures of various lengths, as well as time exposure and bulb exposure mechanism, usually are employed in conjunction with the parts above described, as indicated in said prior patent.

It will be realized by those skilled in the art that the above shutter mechanism is only a convenient example of a typical shutter mechanism with which the synchronizing mechanism of the present invention may be employed, and the shutter mechanism itself is capable of wide modification and variation without departing from the present invention.

The photoflash synchronizing mechanism of the present invention constitutes largely a subassembly mounted on the mounting plate 91, which is supported from the plate 22 by three screws 93, 95, and 97, each surrounded by a spacing sleeve 99. This mounting plate 91, as best seen in Fig. 4, is supported at an elevation above the plane of operation of the master member 41. Two screws 101 and 103 screwed into the plate 91 serve to hold a contact stack or sandwich which, as best shown in Figs. 2 and 4, comprises first a dielectric plate 105 at the bottom of the stack, then a metal plate 107, then another dielectric plate 109, and then at the top of the stack another metal plate 111. Insulating bushings 113 around the screws 101 and 103 serve to insulate these screws thoroughly from both of the metal plates 107 and 111. Both metal plates have their inner edges (toward the center of the shutter) of arcuate form, concentric with a stud 117 screwed into the plate 91, except that the bottom metal plate 107 has its left corner cut away as indicated at 119 in Fig. 2, and the edge of the cut away portion is inclined or beveled at 121.

Pivotally mounted on the screw stud 117, and lying on the top surface of the plate 91, is a lever 125 having a hook-shaped left end 127 cooperating with a stud 129 fixed in and extending upwardly from the master member 41. This lever 125 has near its right end an upwardly extending ear 131 against which bears one end of a spring 133 wrapped around the stud 117, and constantly tending to turn the entire lever 125 in a counterclockwise direction about the pivot 117.

At an intermediate point in the length of the lever 125 there are lateral lugs 141 bent up at two opposite sides of the lever. Embraced between these two lugs or ears 141 and held also by a screw 143 threaded into the lever 125, there is a lower insulating block 145 and an upper insulating block 147 and between them (insulated thereby from the screw 143 and from the lever 125) is a metal contact finger 149. The insulating block 145 is held against turning on the screw 143 by means of the ears 141 which tightly embrace the sides of the insulating block, and the metal contact finger 149 is held against turning by downturned ears 151 turned down from the left end of the member 149 and 153 turned down from opposite sides of the member 149, tightly embracing the insulating block 145.

This metal contact finger 149 extends in a generally rightward and downward direction from the screw 143, when viewed as in Fig. 1, and is split throughout part of its length, as indicated, into two fingers 155 and 157, the former being offset downwardly so as to rub on the top surface of the contact plate 107 as indicated in Fig. 4, and the finger 157 being offset to rub on the bottom surface of the upper contact plate 111. This member 149 with its fingers 155 and 157 is made of metal which is resilient as well as forming a good electrical conductor; for example, beryllium copper. The parts are initially formed with enough offset between the fingers 155 and 157 so that these fingers make a good wiping contact pressing firmly against the members 107 and 111, respectively.

When the master member 41 is in its set or tensioned position shown in Fig. 1, the stud 129 on the master member, engaging the hooked end 127 of the lever 125, holds this lever against the force of the spring 133 to maintain the contact fingers 155 and 157 to the position shown in Figs.

1 and 2, wherein the finger 157 is in contact with and presses upwardly against the under surface of the contact plate 111, but the other contact finger 155 lies opposite the notch 119 in the lower contact plate 107 and consequently is spaced from the plate 107 and does not make electrical contact therewith. When the shutter is tripped or released, the consequent counterclockwise movement of the master member 41 about its pivot 43 carries the stud 129 downwardly from the position shown in Fig. 1 to the position shown in Fig. 3, which movement allows the lever 125 to turn counterclockwise under the influence of its spring 133, following along with the movement of the stud 129. This counterclockwise movement of the lever 125 carries with it the contact fingers 155 and 157, the finger 157 sliding or wiping along the under surface of the contact plate 111, while the finger 155, initially spaced from the contact plate 107, makes contact with this plate 107 after a very slight initial movement, rides up the inclined or beveled shoulder 121 on the plate 107, and thereafter slides or wipes along the upper surface of the plate 107. In this way, almost at the beginning of the movement of the master member 41 the fingers 155 and 157 establish an electrical connection between the two plates 107 and 111. This contact continues for an appreciable time, while the fingers 155 and 157 wipe over the contact plates, thus assuring ample time of contact to set off whatever flashlight bulb or other photoflash device is electrically connected to the plates 107 and 111.

The external photoflash circuit and other parts may be of any conventional kind, including, for example, a photoflash bulb diagrammatically indicated at 161 in Fig. 1, screwed into the conventional socket and connected to a battery or other source of electricity 163. The circuit wires indicated diagrammatically at 165 and 167 lead, respectively, to an outer sleeve 169 and an inner conductor 171 mounted on the shutter casing but insulated from each other and from the shutter casing in the conventional manner well known in the art. The sleeve 169 and conductor 171 are made to fit the standard conventional connection plug used with flashlight circuits.

The inner end of the conductor 171, after passing through the wall of the shutter casing, is connected as by solder 173 to a wire 175 which has its other end suitably connected, as by solder 177, to the lower contact plate 107. The other side of the photoflash circuit (that is, the sleeve 169) is connected to the upper contact plate 111 through mechanism which opens or breaks the circuit just as the master member 41 reaches its completely released or run-down position, so as to avoid accidental and unintentional discharge of a new photoflash bulb which the photographer may insert in the socket while the shutter is still in its released or run-down position, before it is reset or tensioned for the next exposure. Such means for opening or breaking the circuit under these circumstances, although broadly old, is new in the improved form here shown. It comprises a resilient conductor strip 181 mounted on and supported by the inner end of the conducting sleeve 169, inside the shutter casing, this strip 181 extending leftwardly from its support to the vicinity of a downturned ear 183 (Figs. 1 and 4) on the upper contact plate 111. The strip 181 is formed of resilient material which is a good electrical conductor (for example, beryllium copper) and is made with initial tension which constantly tends to move the left end of the strip 181 radially inwardly toward the center of the shutter, to bring it into firm contact with the ear 183. It may, however, be displaced radially outwardly away from the ear 183 by movement of a switch member 191 pivotally mounted on the screw stud 193 screwed into the supporting plate 91, and carrying an upstanding arm 195 surrounded by a layer or sleeve of insulating material 197 which is adapted, under certain conditions, to press against the inner face of the spring conductor strip 183 and move it against its spring tension, radially outwardly away from the ear 183, from the position shown in Fig. 1 to the position shown in Fig. 3.

This switch lever 191 is operated by a stud 201 fixed to the master member 41 and coming up through an appropriate slot in the plate 91. As the master member 41 reaches the end of its counterclockwise movement during the making of an exposure, the stud 201 hits against the edge of the switch lever 199 and moves this switch lever from the position shown in Fig. 1 to the position shown in Fig. 3, so that the insulating sleeve 197 on the ear 195 strikes against the conductor strip 191 and thrusts this member radially outwardly from the position shown in Fig. 1 to the position shown in Fig. 3, moving it away from the ear 183 and breaking the circuit at this point. Then when the shutter is tensioned ready for the next exposure, the tensioning movement or clockwise movement of the master member 41 moves the stud back from the position of Fig. 3 to the position of Fig. 1, and during the latter part of such movement the stud hits against the hook 203 on the switch lever 191 and swings the switch lever in a clockwise direction about its pivot 193, from the position shown in Fig. 3 back to the position shown in Fig. 1, thus allowing the resilience of the conductor strip 181 to move it back into position against the ear 183, completing the circuit at this point. However, this movement of the switch lever 191 and closing of the circuit between 181 and 183 does not occur until after the stud 129 on the master member has moved the lever 125 far enough to swing the contact finger 155 past the beveled edge 121 and into the notch 119 of the lower contact plate 107, opening the circuit at this point. Thus, when the shutter is being set or tensioned, the circuit at 181—183 does not close until the circuit has been opened at the point 107, 155, so that there is no danger of accidentally flashing a photoflash bulb during the resetting operation, even if a fresh bulb has been inserted in the socket.

To hold the switch lever 191 in one position or the other and to insure that it will not become accidentally displaced from either position, frictional retaining means and detent means are provided. As best seen in Fig. 4, the pivot stud 193 on which the switch lever 191 is mounted, is surrounded by a coiled spring 211 which presses firmly down on the top of the switch lever 191, thus pressing it against the top surface of the mounting plate 91. This produces a considerable degree of friction between the switch lever and the stationary mounting plate, to prevent accidental displacement. In order to hold the switch lever with even greater certainty, in its switch-opening position, the switch lever is provided on its top with a punched depression 213 (Figs. 4 and 6) thus forcing a thin V-shaped rib 215 of metal to protrude from the bottom surface of the switch lever, which rib 215 is arranged approximately radially with respect to the pivot stud 193. The top surface of the stationary mounting plate 91 is provided with a groove 217 (Fig. 1) in a location underlying the position occupied by the rib 215 when the switch lever is in the switch-opening position of Fig. 3. Thus when the master member is in its run-down or relaxed position and the switch lever is in the switch-open position of Fig. 3, the rib 215 on the bottom of the switch lever will be seated in the groove 217 of the plate 91. The spring 211 not only holds the switch lever frictionally engaged with the plate 91, but specifically holds the rib 215 down in the groove 217. It takes substantial force (considerably more than the resilient force of the conductor strip 181) to displace the switch lever 191 in a clockwise direction from this position, to cause the rib 215 to ride up out of the groove 217, and there is no appreciable likelihood or possibility of the switch lever accidentally moving from the switch-open position to the switch-closing position until it is positively moved by contact of the master member stud 201 with the switch lever hook 203 just at the end of the setting movement of the master member.

The function and operation of each part of the shutter have been described above in connection with the description of the construction of that part. To recapitulate briefly the operation of the shutter as a whole, it is seen that, starting with the shutter in its run-down or relaxed position shown in Fig. 3, the shutter is first tensioned by moving the setting member 51 in a clockwise direction, whereupon the lug 55 will engage the curved part 57 of the master member 49 and swing the master member against the tension of the strong motor spring 45 in a clockwise direction about its pivot 43, from the position shown in Fig. 3 to the position of Fig. 1. The hook 61 on the master member, toward the latter end of the tensioning movement, rides over and falls behind the shoulder 69 on the release lever or trigger 71. During this setting movement of the master member, the stud 129 thereon displaces the lever 125 in a clockwise direction about its pivot 117, against the tension of its spring 133, and thus carries the contact members leftwardly along the contact plates 107 and 111 until the lower contact member 155 reaches the notch 119 and moves out of contact with the plate 107. Just after the contact 155 moves away from the plate 107 to open the electric circuit at this point, the stud 201 on the master member hits the hook 203 on the switch lever 191, and overcomes the frictional resistance caused by the spring pressure of the switch lever on the plate 91 and by the engagement of the ridge 215 on the switch lever in the groove 217 of the plate 91, and swings the switch lever from the position shown in Fig. 3 to the position shown in Fig. 1, thereby allowing the spring contact 181 to move against and make electric contact with the ear 183 on the contact plate 111. The parts are now ready for making an exposure, and, if a fresh flashlight bulb 161 has been screwed into the usual socket, the only open part of the entire electric circuit is the break at the notch 119 between the contact finger 155 and the lower contact plate 107. All other parts of the circuit are closed.

The exposure is now made by depressing the release member or trigger 71, turning it in a counterclockwise direction about its pivot 73. This withdraws the shoulder 69 from the hook 61 on the master member 41, allowing the stiff motor spring 45 to turn the master member in a counterclockwise direction about its pivot 43, as rapidly as is permitted by the time delay mechanism which is usually incorporated in shutters of this type, but not here shown. During this counterclockwise movement of the master member, the stud 129, almost at the beginning of the movement, moves downwardly far enough so that the lever 125 can turn (under the influence of its own spring 133) counterclockwise about its pivot 117, far enough to bring the contact finger 155 into engagement with the lower contact plate 107. The upper contact finger 157 is already in engagement with the upper contact plate 111. The lower contact finger 155 then wipes along the surface of the plate 107, while the upper contact finger 157 is wiping along the surface of the contact plate 111, the fingers 155 and 157 thus establishing an electric contact between the two plates 107 and 111, which contact continues long enough to make sure that the photoflash bulb 161 is ignited.

While the counterclockwise movement of the master member 41 is allowing the lever 125 to swing as above described, such counterclockwise movement is also causing the lug 65 on the master member to hit against the shoulder 75 on the leaf lever 35, turning this leaf lever in a counterclockwise direction about its pivot 37 and, through the action of the pin 27, causing the shutter blades to open. Then the hook 77 on the master member, during continued movement, hits against the pin 27 and moves it in the opposite direction, causing the shutter blades to close. Toward the latter part of this movement of the master member, the stud 201 thereon hits against the switch lever 191 and moves it counterclockwise on its pivot 193, to the position shown in Fig. 3, which causes the ridge 215 to seat in the groove 217 and at the same time causes the insulating covering 197 on the ear 195 to strike against the spring conductor member 181 and move this conductor member slightly radially outwardly, away from the ear 183 of the top contact plate 111, opening the circuit at this point. This occurs, as above stated, practically at the end of the movement of the master member, and at the very end of such movement, an upstanding ear 231 on the master member strikes against a cushioning pad 233 on the side of the shutter casing, which pad serves to cushion the blow or jar caused by the sudden stoppage of movement of the master member. The parts come to rest in the position shown in Fig. 3.

The exposure is now complete and the shutter may be reset for the next exposure, and a fresh flash bulb 161 may be inserted in the socket, either before or after resetting the shutter, without danger of premature flashing of the bulb in either event. If the fresh bulb is inserted in the socket before the shutter is retensioned, the electric circuit is opened between the members 181 and 183, and during the resetting operation the circuit is opened between the members 107 and 155, just before the circuit is closed between the members 181 and 183.

This synchronizing mechanism being intended for a relatively inexpensive shutter, there is no provision, in the preferred form here shown, for adjustment of the timing relation between the closing of the flash bulb circuit and the opening of the shutter blades, in order to accommodate the shutter especially to flash bulbs having different periods of lag in the production of maximum brilliance of light after the electric circuit is closed. It is known that various kinds of flash bulbs have different lag time. It is well understood by those skilled in the art that two of the most popular kinds of photoflash bulbs have lags of 5 milliseconds and 20 milliseconds, respectively, meaning that the most intense part of the flash of light is produced at five one-thousandths of a second or twenty one-thousandths of a second, respectively, after the electric circuit is closed. In the present shutter, the sizes and proportions of the parts are so designed that, in the making of an exposure, the contact leaf 155 will make contact with the plate 107 at approximately 5 milliseconds before the shutter blades reach their maximum open position. Hence the shutter may be used at all exposure speeds with flash bulbs of the type having a lag of 5 milliseconds, and in addition, it may be used at exposure speeds of 1/50 second or slower with flash bulbs of the type having a lag of 20 milliseconds, for at such speeds the blades remain open long enough to take advantage of a flash which reaches its peak intensity about 15 milliseconds after the shutter blades first reach their maximum open position.

Although the contact finger 157 has been shown as being constantly in contact with the plate 111, it will be obvious that this plate also could be notched at its left end, if desired, so that the contact fingers 155 and 157 would be clear of both plates 107 and 111 in the open position, if desired.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. In a photographic shutter of the type including a master member movable in a tensioning direction to condition the shutter for making an exposure and movable in the opposite direction to make an exposure, a spring tensioned by movement of said master member in said tensioning direction and furnishing the power to move said master member in said opposite direction, and electric circuit parts for operating a flash lamp in synchronism with the exposure; the combination of a first switch and a second switch electrically connected in said circuit in series with each other, a first switch operating member movable between switch-open and switch-closed positions, a spring constantly tending to move said operating member from switch-open position toward switch-closed position, a second switch operating member movable between switch-open position and switch-closed position, means tending to hold said second switch operating member in either of its positions in which it is set, and parts on said master member for engaging both of said switch operating members to move said first switch operating member against the tension of its spring to switch-open position during the latter part of movement of said master member in said tensioning direction and to move said second switch operating member to switch-closed position substantially at the completion of movement of said master member in said tensioning direction.

2. In a photographic shutter of the type including a master member movable in a tensioning direction to condition the shutter for making an exposure and movable in the opposite direction to make an exposure, a spring tensioned by movement of said master member in said tensioning direction and furnishing the power to move said master member in said opposite direction, and electric circuit parts for operating a flash lamp in synchronism with the exposure; the combination of a first switch and a second switch electrically connected in said circuit in series with each other, a first switch operating member movable between switch-open and switch-closed positions, a spring constantly tending to move said operating member from switch-open position toward switch-closed position, a second switch operating member movable between switch-open position and switch-closed position, means tending to hold said second switch operating member in either of its positions in which it is set, an abutment part on said master member for engaging said first switch operating member to move it against the force of its spring from switch-closed to switch-open position when said master member moves in a tensioning direction, said spring of said first switch operating member keeping said operating member in engagement with said abutment part and serving to move said operating member to switch-closed position as fast as permitted by movement of said master member in an exposure-making direction, and an abutment part on said master member for engaging said second switch operating member to move it to switch-closed position substantially at the completion of movement of said master member in said tensioning direction and to move it to switch-open position substantially at the completion of movement of said master member in an exposure-making position.

3. A photographic shutter of the type including a shutter blade movable from a closed position to an open position and back to a closed position, a master member movable to open and then to close said blade to make an exposure, and electric circuit connections for operating a flash lamp in synchronism with said exposure, characterized by the fact that said electric circuit connections include a pivoted switch lever, spring means independent of said master member constantly tending to swing said switch lever on its pivot to switch closing position, and a connection between said master member and said switch lever for controlling the time and rate of movement of said switch lever toward closed position in accordance with the time and rate of movement of said master member, said shutter being further characterized by the provision of a second switch lever, and means operated by said master member for moving said second switch lever to switch opening position after the first switch lever has moved to switch closing position and for moving said second switch lever to switch closing position after the first switch lever has moved to switch opening position.

4. In a photographic shutter of the type including a master member movable in a tensioning direction to condition the shutter for making an exposure and movable in the opposite direction to make an exposure, a spring tensioned by movement of said master member in said tensioning direction and furnishing the power to move said master member in said opposite direction, and electric circuit parts for operating a flash lamp in synchronism with the exposure; the combination of a control member mounted for swinging movement and having a portion lying in the path of travel of said master member to be engaged and swung in one direction by movement of said master member in a tensioning direction, a spring separate from said control member and acting on said control member and tending to move it in the opposite direction to keep it constantly in engagement with said master member so that said control member will move in the opposite direction as fast as permitted by movement of said master member in the opposite direction, and a switch in said circuit including a conducting member mounted on and carried by said control member and a second conducting member mounted in position to be spaced from the first conducting member when said control member is at the limit of its travel in the first direction and to be engaged by said first conducting member in wiping contact therewith as said control member moves in the opposite direction, said combination further including a second switch electrically connected in series with said first switch, and means operated by aid master member for closing said second switch substantially at the completion of movement of said master member in said tensioning direction and for opening said second switch substantially at the completion of movement of said master member in said opposite direction.

5. In a photographic shutter of the type including a master member movable in a tensioning direction to condition the shutter for making an exposure and movable in the opposite direction to make an exposure, a spring tensioned by movement of said master member in said tensioning direction and furnishing the power to move said master member in said opposite direction, and electric circuit parts for operating a flash lamp in synchronism with the exposure; the combination of a control member mounted for swinging movement and having a portion lying in the path of travel of said master member to be engaged and swung in one direction by movement of said master member in a tensioning direction, a spring separate from said contact member and acting on said control member and tending to move it in the opposite direction to keep it constantly in engagement with said master member so that said control member will move in the opposite direction as fast as permitted by movement of said master member in the opposite direction, and a switch in said circuit including a conducting member mounted on and carried by said control member and a second conducting member mounted in position to be spaced from the first conducting member when said control member is at the limit of its travel in the first direction and to be engaged by said first conducting member in wiping contact therewith as said control member moves in the opposite direction, said combination further including a second switch electrically connected in series with said first switch, a switch operating arm movable to one position to close said second switch and movable to another position to open said second switch, frictional means holding said arm in either of its two positions until displaced therefrom by superior force, and a portion on said master member for engaging said switch operating arm to move it to switch closing position substantially at the completion of movement of said master member in said tensioning direction and to move said arm to switch opening position substantially at the completion of movement of said master member in said opposite direction.

6. A photographic shutter of the type including a shutter blade movable from a closed position to an open position and back to a closed position, a master member movable to open and then to close said blade to make an exposure, and electric circuit connections for operating a flash lamp in synchronism with said exposure, characterized by the fact that said electric circuit connections include a stationary switch assembly having a pair of spaced conducting plates arranged approximately in parallel planes spaced from each other with one plate in at least partly overlying relation to the other plate, and a movable switch member shiftable in timed relation to the movement of said master member and having conducting parts engageable, during part of its movement, with both of said spaced conducting plates to complete the electric circuit between the plates, said movable switch member being mounted for swinging movement about an oscillatory axis approximately perpendicular to said planes of said plates and having conducting means entering the space between said plates and arranged to rub on the upper surface of the lower conducting plate and on the lower surface of the upper conducting plate during an effective shifting movement of said switch member, with the conducting means of said switch member constantly engaged with a surface of one of said conducting plates in all normal positions of said switch member and with said conducting means out of engagement with the other of said conducting plates when said switch member is in one position and in contact with said other of said conducting plates when said switch member is in other positions, said shutter being further characterized by a spring tending to move said switch member to switch-closing position, and an interconnection between said switch member and said master member effective to hold said switch member in switch-open position when said master member is in a set position at one end of its path of travel and to release said switch member for movement toward switch-closing position only when and at the rate that said master member moves from its set position toward the other end of its path of travel.

7. A structure as defined in claim 6, in which said conducting means of said movable switch member includes a metal strip split longitudinally through part of its length and having part of the metal on one side of the split offset in one direction to engage with one of said conducting plates and part of the metal on the other side of the split offset in the opposite direction to engage with the other of said conducting plates.

FRIEDRICH A. GUSTAV PIRWITZ.
GUSTAVE PAUL PIRWITZ.
JACK H. SUTTON.

REFERENCES CITED

The following references are of record in the file of this patent:

UNITED STATES PATENTS

| Number | Name | Date |
|---|---|---|
| 1,968,597 | Blake | July 31, 1934 |
| 2,049,735 | Grogin | Aug. 4, 1936 |
| 2,145,917 | Boesser | Feb. 7, 1939 |
| 2,282,850 | Brownscombe | May 12, 1942 |
| 2,358,941 | Schwarz | Sept. 26, 1944 |
| 2,404,526 | Pirwitz | July 23, 1946 |
| 2,405,741 | Fuerst | Aug. 13, 1946 |
| 2,474,378 | Simmon et al. | June 28, 1949 |
| 2,502,668 | Pirwitz | Apr. 4, 1950 |